United States Patent

Thorson et al.

Patent Number: 5,623,759
Date of Patent: Apr. 29, 1997

[54] METHOD OF ATTACHING A VOICE COIL TO AN ACTUATOR ARM

[75] Inventors: Laurene J. Thorson, Louisville; Richard E. Rupp, Jr., Berthoud; John D. McCrandall, Longmont, all of Colo.

[73] Assignee: Maxtor Corporation, Longmont, Colo.

[21] Appl. No.: 568,314

[22] Filed: Nov. 30, 1995

Related U.S. Application Data

[63] Continuation of Ser. No. 336,552, Nov. 9, 1994, abandoned.

[51] Int. Cl.$^6$ .................. G11B 5/42; G11B 5/187
[52] U.S. Cl. .............. 29/603.04; 156/292; 360/106
[58] Field of Search .................... 29/603.03, 603.04, 29/603.06, 602.1; 360/105, 106, 109, 97.01, 99.07; 156/292

[56] References Cited

U.S. PATENT DOCUMENTS

| | | | |
|---|---|---|---|
| 4,126,933 | 11/1978 | Anderson et al. | 29/598 |
| 4,739,427 | 4/1988 | Kilmer et al. | 360/97 |
| 4,879,617 | 11/1989 | Sampietro et al. | 360/106 |
| 5,031,062 | 7/1991 | Wood et al. | 360/98.08 |
| 5,041,924 | 8/1991 | Blackborow et al. | 360/69 |
| 5,107,366 | 4/1992 | Huang et al. | 359/223 |
| 5,148,399 | 9/1992 | Yoshida et al. | 360/109 |
| 5,179,482 | 1/1993 | Tanaka et al. | 360/97.01 |

FOREIGN PATENT DOCUMENTS

93/10531  5/1993  WIPO.

*Primary Examiner*—Carl E. Hall
*Attorney, Agent, or Firm*—Sheridan Ross P.C.

[57] ABSTRACT

An improved arm for an electronic servo mechanism is described which includes a plurality of glue pockets formed within it for bonding a coil assembly to the arm. A method for bonding the coil assembly to the arm is described in which a predetermined amount of glue is placed into each of the glue pockets.

25 Claims, 7 Drawing Sheets

METHOD OF ATTACHING A VOICE COIL TO AN ACTUATOR ARM

This application is a continuation of application Ser. No. 08/336,552, filed Nov. 9, 1994, now abandoned.

BACKGROUND OF THE INVENTION

(1) Field of the Invention

The present invention is generally directed to the field of electronic servo mechanisms and more particularly to an improved arm assembly and a method for bonding a coil assembly to an actuator arm.

(2) Prior Art

Servo mechanisms for controlling the position of an arm, and for movement of the arm are known and used in a number of industries for performing a broad range of functions. The uses may include the movement and control of writing instruments such as pens, laser reading and writing elements. Other uses may include the movement of mechanical elements within electronic devices such as CD players, tape playing devices, etc. Miniaturization of components in the electronics industry has created the need for smaller and smaller servo mechanisms. In addition, many sectors of the electronics industry are moving towards portable battery powered systems. In these battery powered systems efficiency is extremely important as low power consumption is critical to battery life.

Though the servo mechanism described in the present invention could be used in any number of industries for any number of purposes, the servo mechanism will be described below with reference to it's use in the computer industry, and in particular with reference to a computer disk storage system.

In most disk storage systems a plurality of disks are stacked on a spindle and a corresponding plurality of magnetic heads are used to read to and/or write from the disk surfaces. The magnetic heads are typically mounted onto sliders which are suspended over the surfaces of the disk such that they fly over the surfaces of the disk upon the rotation of the disks. Each of the sliders is flexibly attached to an actuator arm. The actuator arm is mounted so that it can rotate about an axis such that the sliders may move across the radius of the spinning disk in order to provide access to all the surface area of the disk. Magnetic data is typically stored on the disk in a circular path, each circular path of stored data defining sectors located on the disk. The actuator arm is typically rotated by a magnetic motor drive. The magnetic motor drive consists of a pair of magnets suspended above and below a coil assembly consisting of wire wrapped around a bobbin which is mounted on to the arm assembly. The coil assembly is referred to in the computer industry as a "voice coil." Electrical current is applied to the voice coil so as to create a magnetic field. The interaction between this magnetic field and the magnetic field produced by the two magnets causes the actuator arm to rotate about a pivot pin. As the actuator arm is moved from one position to the another the read/write head traverses the radius of the surface of each disk. The platters and the actuator arm assembly are located in a chamber within the disk drive unit. The chamber protects the platters and the actuator arm assembly from dust and other particles that may become trapped within the drive case. These particles can render the disk drive inoperative if they would become entrenched into either the platters or the read/write heads and mechanisms.

Prior art arm assemblies typically contain an opening having a recessed ledge into which the voice coil is mounted. The ledges give a surface for attachment and with glue adhesive. The voice coil is typically attached to the actuator arm by placing both the voice coil and the actuator arm into a fixture. Glue is then applied to the entire perimeter of the interface between the voice coil and the actuator body. This glue is typically manually applied by an operator. The operator may apply too much or too little glue and the application is nonuniform. Some of the problems associated with this prior art method were the fact that the amount of glue applied along the bond line was totally reliant on the speed at which the operator moved along the perimeter interface. This results in an inconsistent amount of glue being applied along the bond line. Both the application of excessive glue and the application of insufficient glue are disadvantageous. The application of excessive glue can cause interference between the voice coil and the actuator arm and other devices such as the magnets which partially surround the voice coil and actuator arm. In addition, excessive glue can affect the balance of the arm. The application of insufficient glue may cause the voice coil to separate from the actuator arm body.

In order to avoid the problems associated with interference due to accessive glue application prior art methods have typically included a cleaning step. This cleaning step typically uses chemical cleaning solvents to remove any excess glue which protrudes above or below the voice coil and/or the arm. This additional cleaning step is undesirable as it adds an additional process stop which adds additional costs to the manufacturing process. In addition, an incomplete cleaning may create interface problems or smear glue over the surface of the coil so as to interfere with the effectiveness of the magnetic drive. Furthermore, fluorocarbons are typically used as cleaning solvents (CFC's, isopropyl alcohol, and acetone are also used.) These fluorocarbons are environmentally undesirable. Furthermore, the cleaning step may cause unwanted particles to adhere to the arm and the coil assembly and to be sealed within the chamber which houses the actuator arm and the disks. Another problem associated with the prior art methods include glue outgassing problems which may be compounded by the application of too much glue.

As disk drive units become smaller and smaller tolerances between the different component become more critical. Thus, the manufacture of components becomes more difficult. Thus, new methods for manufacture are required. Since, more and more disk drive units are being used on portable computers which have limited battery life, the efficiency issue becomes important. The efficiency of a magnetic drive motor is directly dependent on the distance between the actuator coil and the magnets. Prior arm systems typically employ a ledge assembly. The ledge assembly may shield a portion of the voice coil from the magnets, thereby reducing the magnetic flux produced by the voice coil. To avoid this problem, and to maintain the smallest possible distance between the voice coil and the magnets, smaller magnets are typically used. As the full flux of the voice coil cannot be used, and due to the reduced flux due to the use of smaller magnets which only partially cover the voice coil efficiency is reduced. Another problem associated with ledge structures is the fact that the ledge structures shield areas containing glue from the curing process such that curing may be complete or the cure stops requires more time to complete.

What is needed is a method for bonding a voice coil to an actuator arm which will not result in the over application or the under application of glue.

SUMMARY OF THE INVENTION

The novel apparatus and process of the present invention overcomes the deficiencies of the prior art by the use of a number of glue pockets in the actuator arm. The glue pockets are positioned such that they adjoin an opening in the actuator arm into which the voice coil is to be affixed. After placing the arm and the voice coil into a jig, a predetermined amount of glue is placed into each glue pocket. The location of the glue pockets and the spacing between the voice coil and the opening in the actuator arm into which the voice coil is to be affixed are such that the glue wicks into the annular space between the voice coil and the sides of the opening in the arm. A consistent and predictable glue bond line is thus achieved. Furthermore, the glue is then cured so as to secure the voice coil within the opening in the arm. The present invention is described with reference to two embodiments. The first embodiment incorporates a conventional ledge structure. The second embodiment is a structure which does not have a ledge structure above or below the voice coil. Advantages of the first embodiment of present invention over the prior art include the fact that the process is faster, and the fact that an additional processing step would not be required for the removal of excess glue from the top and bottom surfaces of the arm and the voice coil. In a second embodiment of the present invention a structure is shown which does not have any ledge structures. This no-ledge structure allows for the use of larger magnets which allows for greater efficiency. Efficiencies also increase due to the fact that there is no-ledge structure to interfere with the magnetic flux generated by the voice coil. In addition, a full-cure may easily and efficiently be obtained as there is no obstruction to prevent or delay the curing process.

DETAILED DESCRIPTION OF THE INVENTION

The following is a description of two embodiments of an arm for use in a servo mechanism and a method for attachment of a wire coil to the arm of a servo mechanism. Though the servo mechanism claimed in the present invention may be used for any of a number of purposes, a mechanism for movement of a read/write head formed oil a slider which is used for reading data from and writing data to a magnetic disk of a computer disk drive system will be described. In the following description numerous specific details are set forth such as dimensions, materials, layers, thicknesses, etc., in order to provide a thorough understanding of the present invention. However, it will be obvious to one skilled in the art that the invention may be practical without these specific details. In other instances well-known processing techniques, materials, circuits, etc. have not been shown in detail in order to avoid unnecessarily obscuring the present invention.

Figure 1:
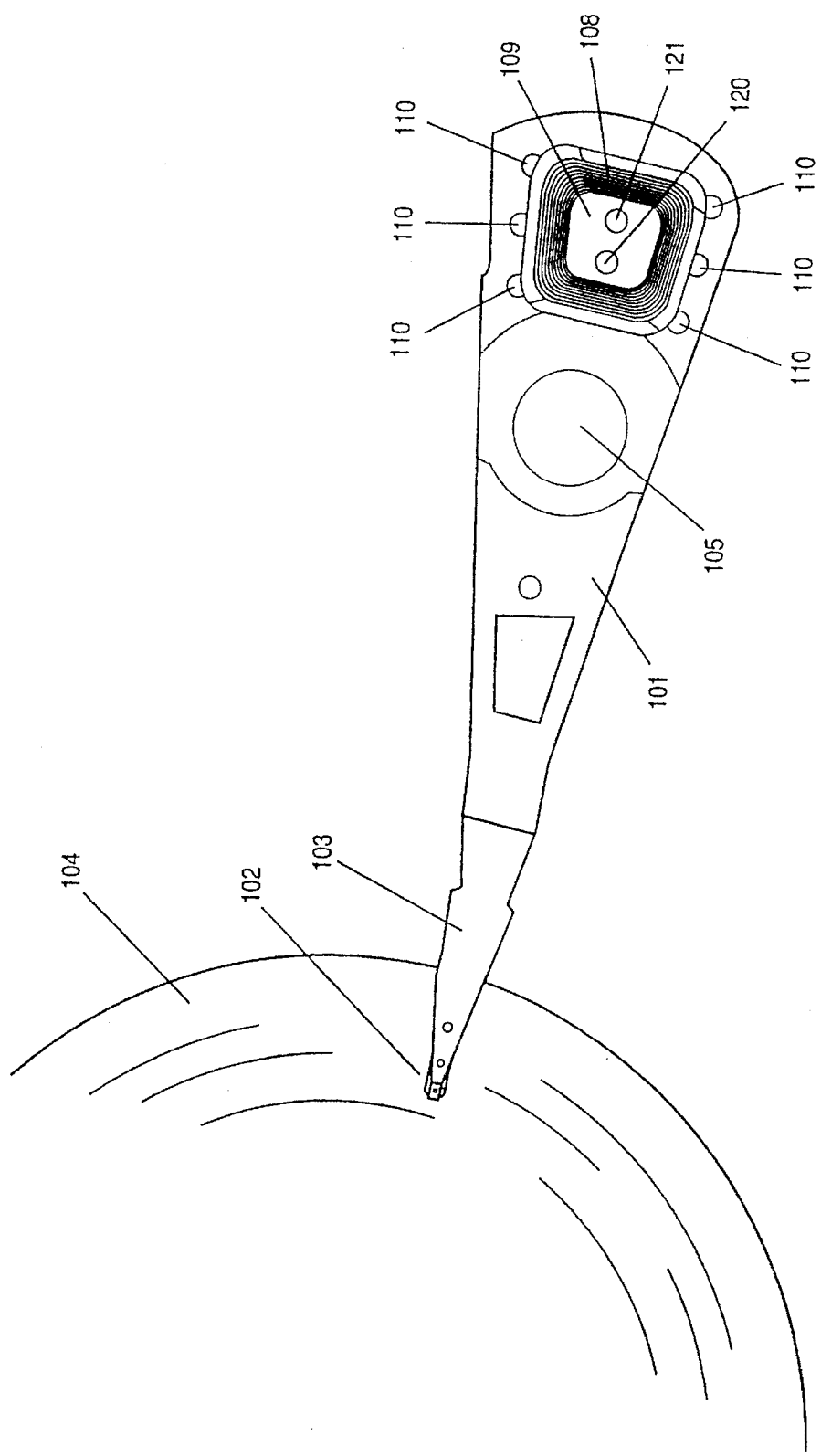
FIG. 1 is a top view of the first embodiment showing an arm assembly into which voice coil has been secured.

FIG. 1 illustrates what will be referred to as a top view of an arm assembly for reading data from and writing data to a magnetic disk. FIG. 1 is referred to as a top view as it illustrates the top of the arm when the arm is placed into the jig for bonding the voice coil to the arm. However, the assembly could be fledgeped over for use in a computer disk drive assembly. In other words, the glue pockets could be placed either on the top or the bottom of the arm as it is used in the finished product.

Disk 104 is spun about it's center point. Slider 102 will then fly above the disk surface. Slider 102 will have a read/write head attached thereto for reading and writing data to the magnetic disk 104. The slider is attached to the arm 101 by head flexure 103. Head flexure 103 is flexible so as to allow for the bottom of slider 102 to rest on the surface of magnetic disk 104 when magnetic disk 104 is not spinning and to allow slider 102 to fly above the surface of magnetic disk 104 when magnetic disk 104 is rotating. Arm 101 has circular opening 105 formed in it for mounting the arm to the disk drive housing. Preferably the arm is mounted to the disk drive housing by means of a cylindrical mounting pin which extends into circular opening 105. Thus, the arm may rotate about an axis running through the center of opening 105. The axis which runs through the center of opening 105 and about which the arm pivots will be referred to as axis A—A. Also shown is coil 108 and bobbin 109. Bobbin 109 typically consists of a frame constructed of plastic have opening 120 and opening 121 formed in the bobbin. These opening are for positioning and holding the bobbin onto a jig. Layers of wire are wrapped around the bobbin so as to form coil 108. This coil is typically made up of copper though any of a number of conductive metals may be used. The portion of the arm into which the voice coil is mounted may be referred to as the coil attachment end of the arm and the drive end of the arm, and the other end of the arm may be referred to as the head attachment end.

Figure 2:
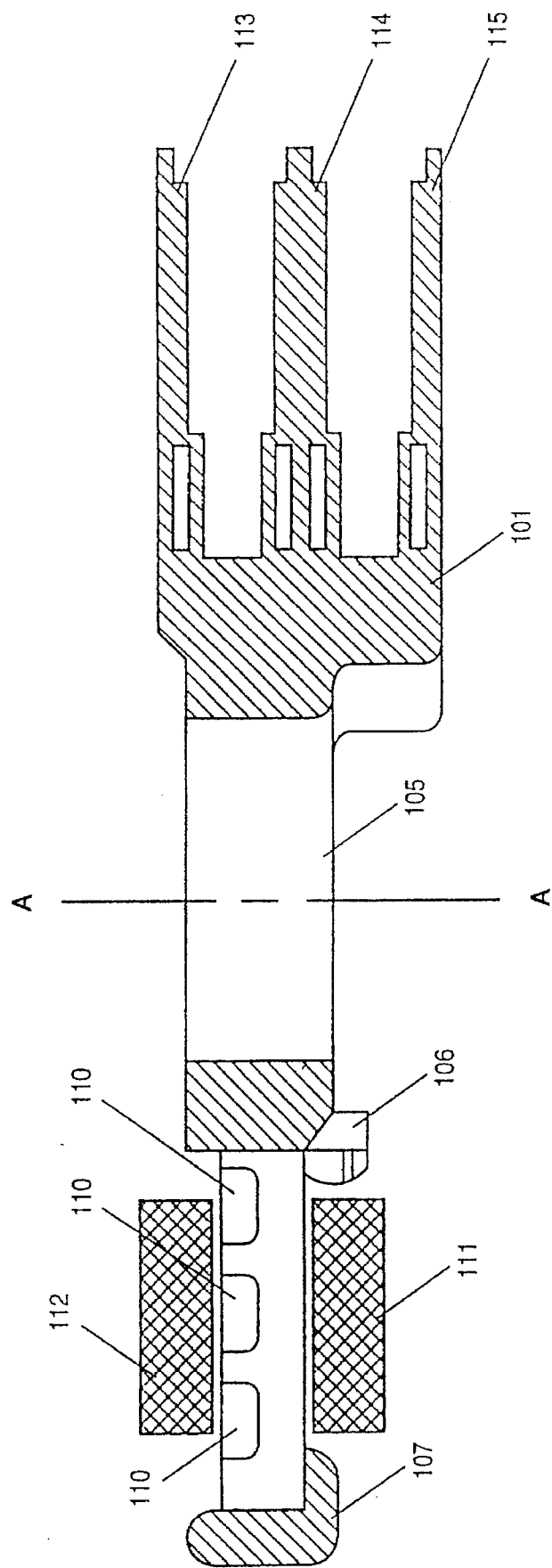
FIG. 2 is a side view of the first embodiment showing an arm into which a voice coil/has been secured having magnets placed above and below the voice coil.

FIG. 2 shows a side cross sectional view running through the center of the arm and shows the magnets which lie above and below the voice coil. Axis A—A is shown to extend through the center of opening 105. The arm rotates about this axis in order to access the different regions of the magnetic disk. The magnetic disks, sliders, and head flexures associated with the disk drive assembly are not shown in this view so that the glue pockets may be more clearly shown. However, a typical disk drive incorporating the disclosed arm assembly would contain 3 magnetic disks. Each of the legs 113, 114, and 115 would have 2 head flexures extending from the leg, each of the head flexures would be attached to a slider such that both the bottom and the top surfaces of each of the disks could be read from and written to by a read/write head located on each of the sliders. The electro magnetic drive mechanism consists of magnet 112 located above the opening in the arm which houses the coil, magnet 111 which is located below the opening in the arm which houses the coil, and the coil-assembly itself which is not shown in this diagram. Magnets 111 and 112 create a magnetic field. Application of electrical current to the coil itself creates a magnetic field around the coil. This magnetic field interacts with the magnetic field generated by magnets 111 and 112 to cause the arm to rotate about axis A—A.

As magnetic flux density is directly proportional to the distances between any given magnet, it is important that the distances be minimized. In the configuration shown in FIG. 2 this would mean that the distances between magnet 111, the coil, and magnet 110 should be minimized. Ledge 107 and ledge 106 are structures which extend below the opening for the coil. Because of the ledge structures 107 and 106, magnet 111 must have a size smaller than that of the voice coil itself in order to minimize the distance between the magnet and the coil. The air gap between the coil and the magnet should be less than 0.015 inches, and preferably 0.005 inches or less. In order to maintain a balanced magnetic field, upper and lower magnets having the same size are typically used. Thus, magnet 112 does not have any ledge structures requiring that it be smaller than the size of the surface of the voice coil, a magnet having the same size as magnet 111 would typically be used. Glue pockets 110 are shown formed within the arm around the opening into which the coil is to be mounted. These glue pockets allow for glue to be placed in the glue pockets during the bonding of the coil to the arm. The glue flows into the annular area between the coil and the opening in the arm such that an efficient and uniform bonding of the coil to the arm may be achieved. In the embodiment illustrated in FIG. 2 the distance between the upper and lower surfaces of the arm in the region between the magnets is approximately 0.075 inches and the glue pockets 110 are inset by a distance of 0.040 inches. The coil and bobbin used in this embodiment may have a total thickness of 0.075 inches and a length of 0.536 inches, and a maximum width of approximately 0.536 inches. The coil width may be 0.203 inches so as to allow an annular space of between 0.002 and 0.030 inches, and preferably 0.020 inches between the outside of the coil and the sides of the coil opening in the arm. Though current devices may allow for electrical contact between the coil and the arm, a more efficient magnetic drive may be achieved by eliminating any electrical contact between the arm and the coil assembly. For this reason a nonconductive glue such as Loctite 366 is preferably used. The distance between the magnets and the coil may be 0.001 to 0.002 inches.

Figure 3:
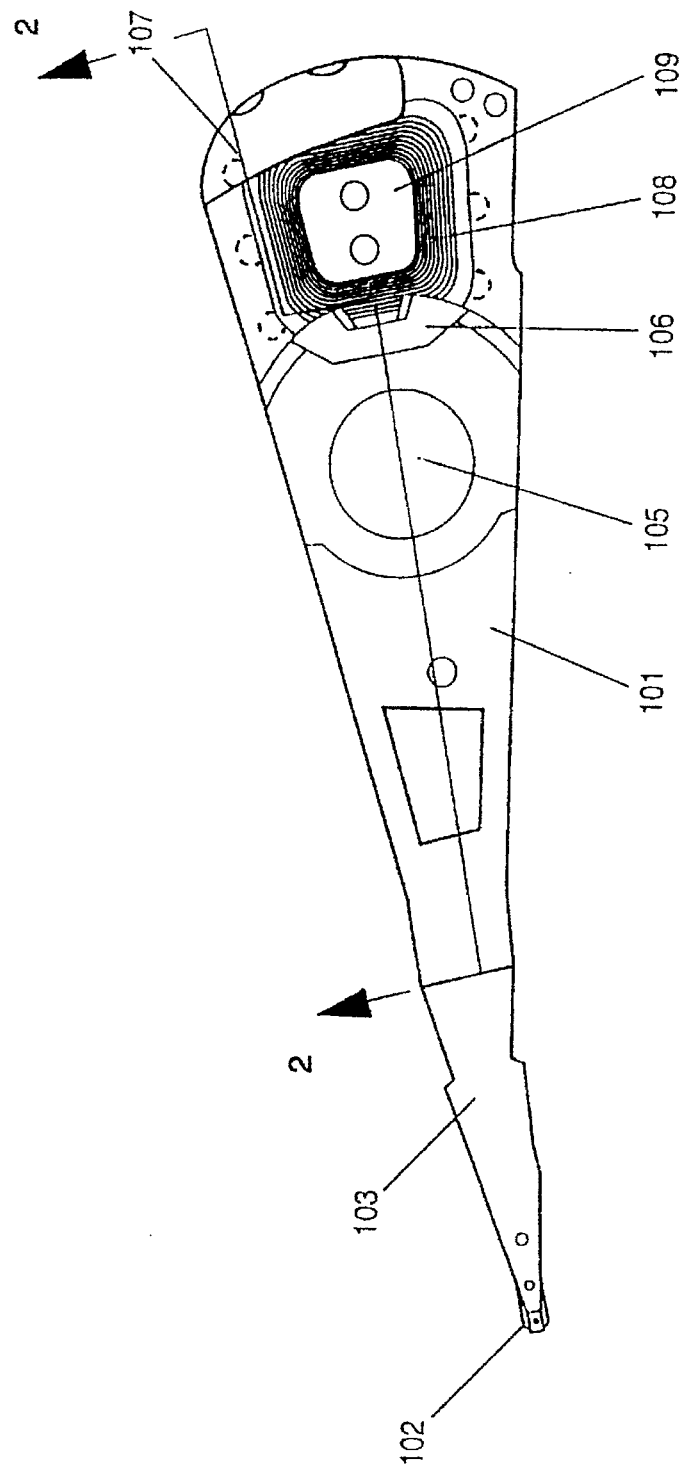
FIG. 3 is a bottom view of the first embodiment showing an arm assembly into which a voice coil has been secured.

FIG. 3 is a bottom view of the first embodiment of the present invention showing slider 102 connected to arm 101 by head flexure 103. Also shown is bobbin 109 and coil 108 which has been inserted into the coil opening of arm 101. Also shown is ledge structure 106 and ledge structure 107.

Figure 4:
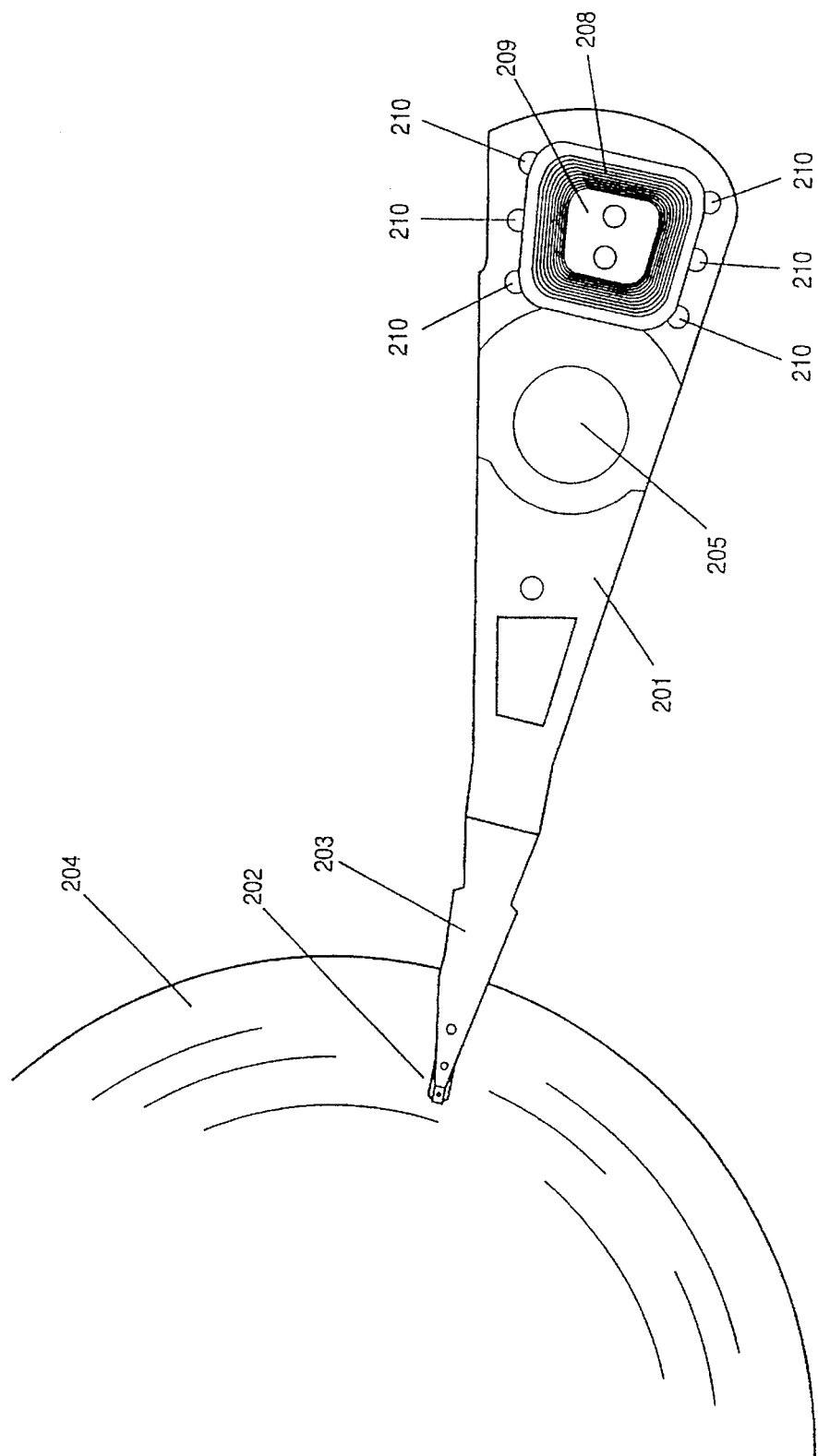
FIG. 4 is a top view of the second embodiment showing an arm having glue pockets into which a voice coil has been secured.
Figure 5:
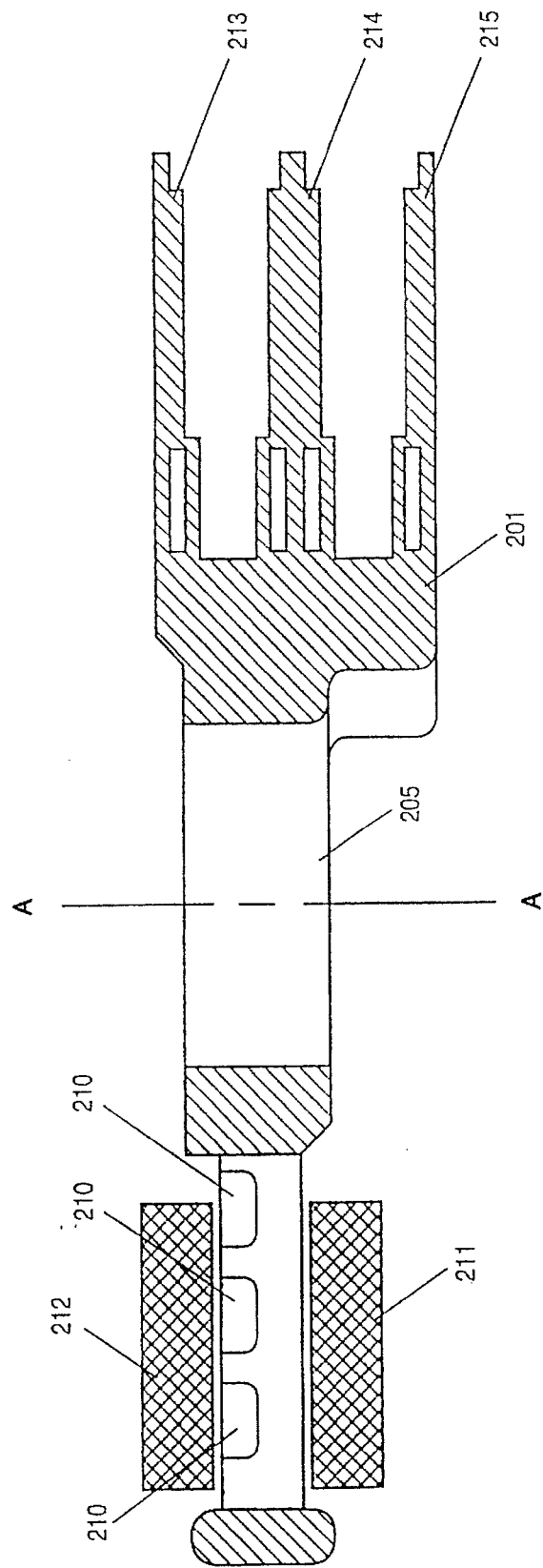
FIG. 5 is a side view of the second embodiment showing an arm into which a voice coil has been secured having magnets placed above and below the voice coil.
Figure 6:
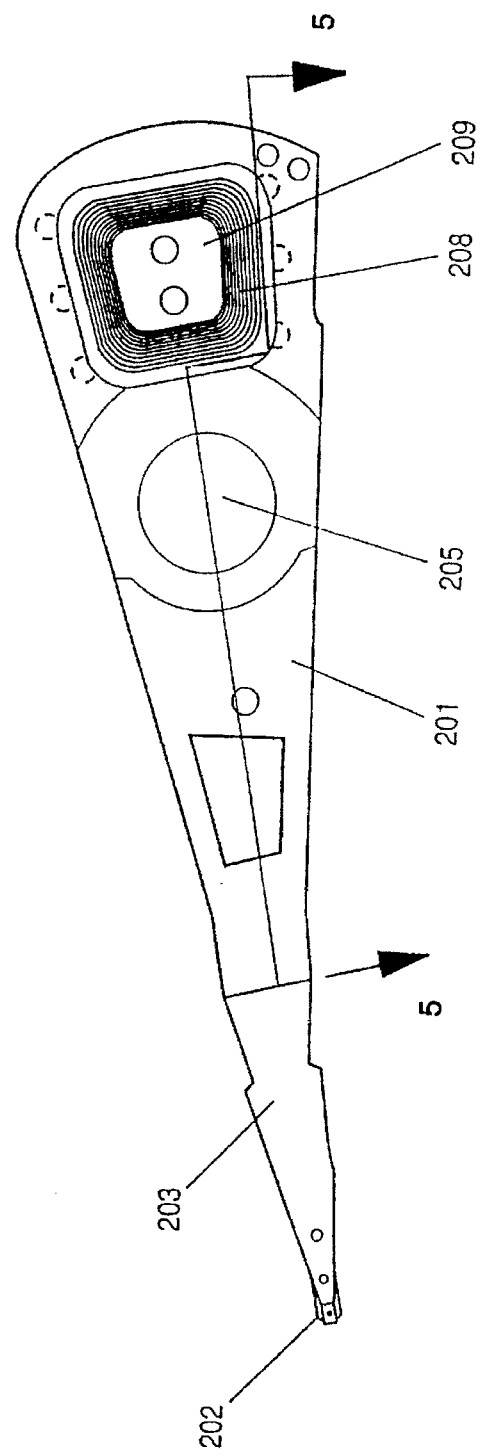
FIG. 6 is a bottom view of the second embodiment showing an arm assembly into which a voice coil has been secured.

FIGS. 4, 5 and 6 show a second embodiment of the present invention in which there are no ledge structure protruding above or below the opening in the arm for the coil assembly.

FIG. 4 shows disk 204 upon which slider 202 may be moved. Head flexure 203 connects slider 202 to arm 201. The arm is mounted to the disk drive housing via opening 205 which may be inserted into a mounting pin attached to the disk drive housing. A coil assembly is shown which is inserted into an opening in the arm 201. The coil assembly consists of bobbin 209 and coil 208. A number of glue pockets 210 are shown to border the opening in the arm into which the coil assembly is located. Referring now to FIG. 2 which is a cross section running through the center of the arm it can be seen that arm 201 containing legs 213, 214, and 215 which are designed to pivot about axis A—A contains a number of glue pockets 210. Note that there are no ledge structures such as ledge structure 106 and structure 107 shown in the first embodiment. Magnet 211 and magnet 212 may be longer than magnets 111 and 112 shown in the first embodiment. Magnets 211 and 212 may extend over the entire length of the coil assembly. This allows for a more energy efficient magnetic drive as the magnetic flux generated by magnet 211 and magnet 212 will be greater than that generated by magnets 111 and 112 shown in the first embodiment.

FIG. 6 shows a bottom view of the second embodiment of present invention. Arm 201 to which slider 202 is attached by head flexure 203 is shown. Opening 205 is shown as is the coil assembly consisting of bobbin 209 and coil 208. Note that there is no ledge structures such as ledge structure 106 and ledge structure 107 which were shown in the first embodiment of the invention. As there are no ledge structures it can be seen from this diagram that the entire bottom surface area of the coil assembly is exposed.

Thus, the second embodiment of the present invention provides an arm and coil assembly which may be secured together so as to provide a assembly for a servo mechanism which may create a full and unobstructed magnetic field and will allow for the use of larger magnets and which may be assembled such that excess glue deposits or insufficient glue deposits are avoided.

Figure 7:
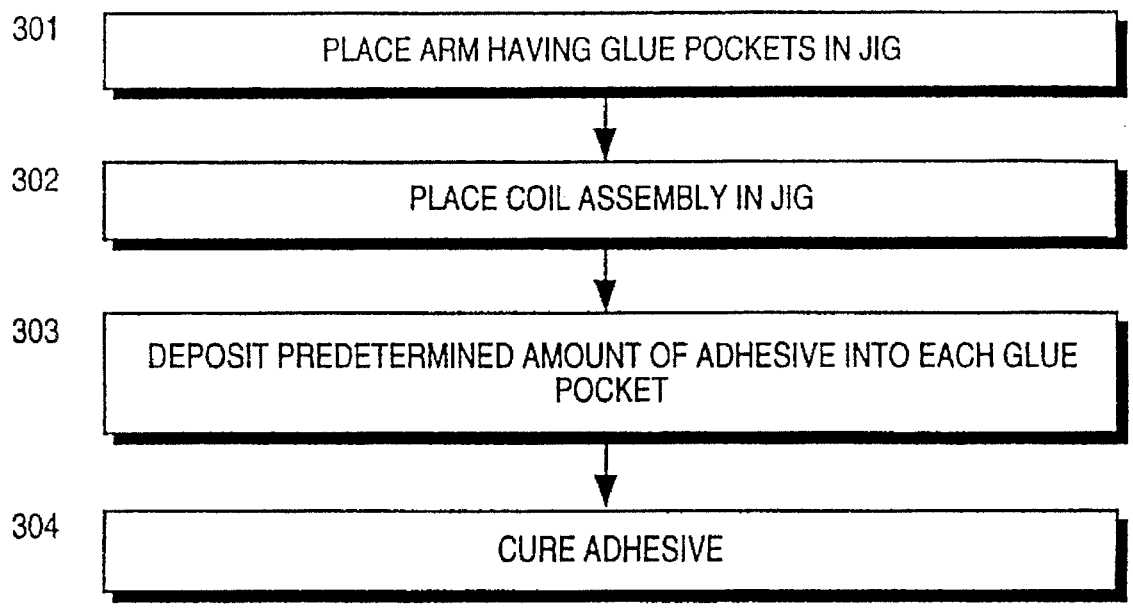
FIG. 7 shows the steps of the method for attachment of a coil to the arm of an electronic servo mechanism.

FIG. 7 details the steps of the method for attaching the coil assembly to the servo arm. First, shown by block 301 an arm having glue pockets is placed into a specially designed jig. The number, size, and location of glue pockets shown in the first and second embodiments of the present invention may be used. However, any number of glue pockets could be used as could other shapes and sizes of glue pockets. A number of types of jigs could be used for bonding the coil assembly to the arm. However, the preferred embodiment of the present invention, a jig having 2 protruding alignment pins issued. One of the pins may be inserted into bobbin alignment opening 120 shown in FIG. 1 and the other may be inserted into bobbin alignment opening 121 of FIG. 1 so as to secure and align the coil assembly for gluing.

Next, as shown by block 302, the coil assembly is placed into the jig. The coil assembly is placed into the jig such that one of the alignment pins on the jig enters into bobbin alignment openings 120 and such that a second alignment pin enters into one of the bobbin alignment opening. Of course, the use of two protruding alignment pins is only one way to secure the coil assembly to the jig. Any number of other methods for securing the coil assembly in the proper position and aligning the coil assembly could be used. These methods could include the use of ridges or grooves located on either the bobbin or on the jig the coil assembly will be positioned such that it does not extend above or below the surface of that portion of the arm over which the magnets will be positioned. Preferably, the top and bottom surfaces of the coil assembly will be flushed with the top and bottom surfaces of that portion of the arm over which the magnets will be positioned.

Next, a predetermined amount of glue is placed into each of the glue pockets as is illustrated by block 303. Although any type of glue may be used, an off the shelf glue such as Loctite Impruv 352 adhesive may be used. In order to assure that a uniform amount of glue is placed into each glue pocket a glue dispensing apparatus such as a EFD brand dispensing device is used. The EFD uses a timing mechanism to dispense a uniform amount of glue. A uniform amount of glue is then dispensed into each one of the glue pockets by an operator using the dispensing device. In the embodiments of the present invention shown in FIGS. 1–6 this would involve the dispensing of a measured volume of glue into each of the six glue pockets. The EFD dispensing may be performed at an air pressure of 25 pounds per square inch pressure (PSI), and at a vacuum of 2.5 inches using a timer setting of 10. Next, as shown by block 304, a UV cure step is performed. In the UV cure step the jig containing the arm and coil assembly is passed via a conveyer belt into a UV oven. Of course, depending on the type of UV oven, the bulb intensity, and the desired speed of cure, any number of different parameters could be used for curing the glue. The Loctite 352 adhesive may be cured by a UV bulb having between 2 and 6 Joules per square centimeter preferably 2.5 Joules per square centimeter at a height of between 3 and 5 inches from the belt, preferably 3.5 inches and at a belt speed which gives between 10 to 30 seconds of exposure preferably 20 seconds. However, any type of oven or curing method which will meet the curing requirements specified by the manufacturer of the Loctite 36 adhesive may be used. Note that a superior cure is achieved in the second embodiment of the present invention due to the fact that there are no obstructions such as the ledge structures shown in the first embodiment to impede the curing process. Thus a quick and full cure of the glue may be obtained. The entire annular area between the outer edges of the voice coil assembly and the inner diameter of the opening into which the voice coil assembly is inserted does not necessarily need to be covered with glue to give an adequate and sufficient bond. Preferably a second cure is performed by placing the jig containing the arm and coil assembly into a conventional oven having a temperature of 121° celsius for approximately 15 minutes.

What is claimed is:

1. A method for assembling an actuator arm assembly comprising a voice coil assembly and an actuator arm, said actuator arm comprising a first actuator arm surface for interfacing with said voice coil assembly and a plurality of adhesive receptacles formed in said actuator arm which interface with said first actuator arm surface, said method comprising the steps of:

disposing a first voice coil surface of said voice coil assembly generally adjacent to said first actuator arm surface;

maintaining a first space between said first voice coil surface and said first actuator arm surface;

disposing an adhesive in each of said plurality of adhesive receptacles in said actuator arm;

wicking said adhesive in said plurality of adhesive receptacles into said first space between said first voice coil surface and said first actuator arm surface;

substantially limiting said adhesive to said first voice coil surface and said first actuator arm surface; and interconnecting said voice coil assembly and said actuator arm, said interconnecting step comprising using said adhesive.

2. A method, as claimed in claim 1, wherein:

said first space is circumferentially disposed about a perimeter of said voice coil assembly, wherein said first voice coil surface and said first actuator arm surface each comprise a circumferential surface.

3. A method, as claimed in claim 1, wherein:

a height of said first voice coil surface is substantially equal to a height of said first actuator arm surface.

4. A method, as claimed in claim 1, wherein:

said disposing a first voice coil surface step comprises utilizing at least one alignment hole in said voice coil assembly, wherein each said alignment hole in said voice coil assembly is substantially free of adhesive during said disposing an adhesive step, said wicking step, and said interconnecting step.

5. A method, as claimed in claim 1, wherein:

said disposing a first voice coil surface step comprises disposing said actuator arm in a jig comprising a first alignment pin, wherein said voice coil assembly comprises at least one alignment hole, said disposing a first invoice coil surface step further comprising mounting said voice coil assembly on said first alignment pin of said jig using said at least one alignment hole on said voice coil assembly.

6. A method, as claimed in claim 1, wherein:

said maintaining a first space step comprises maintaining a width for said first space between said first voice coil surface and said first actuator arm surface ranging from about 0.002 inches to about 0.030 inches.

7. A method, as claimed in claim 1, wherein:

a location of said adhesive receptacles along said first actuator arm surface and said maintaining step allow for said wicking step.

8. A method, as claimed in claim 1, wherein:

said disposing an adhesive step comprises injecting a predetermined amount of said adhesive into each of said plurality of adhesive receptacles.

9. A method, as claimed in claim 8, wherein:

said predetermined amount of adhesive is selected to support said substantially limiting step.

10. A method, as claimed in claim 1, wherein:

all of said adhesive used in said method is introduced through said plurality of adhesive receptacles by said disposing an adhesive step.

11. A method, as claimed in claim 1, further comprising the step of:

using said adhesive receptacles only for said wicking step.

12. A method, as claimed in claim 1, wherein:

said wicking step comprises achieving an adhesive line between said first voice coil surface and said first actuator arm surface.

13. A method, as claimed in claim 1, wherein:

said wicking step comprises forming an adhesive interface between said first voice coil surface and said first actuator arm surface, said adhesive interface consisting essentially of a band which is no thicker than a thickness of either of said first voice coil surface and said first actuator arm surface.

14. A method, as claimed in claim 1, wherein:

said voice coil assembly further comprises upper and lower voice coil surfaces, said first voice coil surface being disposed between said upper and lower voice coil surfaces, said upper and lower voice coil surfaces and said first voice coil surface defining an entirety of an exterior surface of said voice coil assembly, wherein said upper and lower voice coil surfaces remain substantially free of adhesive during and after said wicking step by said substantially limiting step.

15. A method, as claimed in claim 14, further comprising the step of:

providing substantially no interference of a magnetic field of said voice coil assembly along said upper and lower voice coil surfaces by said substantially limiting step.

16. A method, as claimed in claim 1, wherein:

said substantially limiting step consists essentially of said wicking step.

17. A method, as claimed in claim 1, wherein:

said substantially limiting step is achieved solely by said wicking step.

18. A method, as claimed in claim 1, wherein:

said interconnecting step consists essentially of said using said adhesive step, wherein only said adhesive interconnects said voice coil assembly and said actuator arm.

19. A method, as claimed in claim 1, further comprising the step of:

selecting an electrically nonconductive adhesive for said disposing an adhesive step.

20. A method, as claimed in claim 1, further comprising the step of:

curing said adhesive after said wicking step.

21. A method, as claimed in claim 20, wherein:

said curing step comprises exposing said adhesive to ultraviolet light after said wicking step.

22. A method, as claimed in claim 20, wherein:

said curing step comprises heating said actuator arm assembly.

23. A method, as claimed in claim 20, wherein:

said curing step comprises performing first and second separate curing steps.

24. A method, as claimed in claim 20, wherein:

said curing step is applied directly to said adhesive, wherein no structure of said actuator arm or said voice coil assembly interferes with said curing step.

25. A method, as claimed in claim 1, further comprising the step of:

interconnecting a read/write head on said actuator arm.

* * * * *